(12) United States Patent
Hofmann et al.

(10) Patent No.: US 7,871,134 B2
(45) Date of Patent: Jan. 18, 2011

(54) WHEEL HUB COMPRISING AXIAL RECESSES FORMED BETWEEN THE HOLES FOR LUG BOLTS

(75) Inventors: Heinrich Hofmann, Schweinfurt (DE); Horst Doeppling, Herzogenaurach (DE); Peter Niebling, Bad Kissingen (DE); Robert Plank, Weisendorf (DE)

(73) Assignee: Schaeffler KG, Herzogenaurach (DE)

( * ) Notice: Subject to any disclaimer, the term of this patent is extended or adjusted under 35 U.S.C. 154(b) by 46 days.

(21) Appl. No.: 12/092,514

(22) PCT Filed: Nov. 2, 2006

(86) PCT No.: PCT/DE2006/001917

§ 371 (c)(1),
(2), (4) Date: May 2, 2008

(87) PCT Pub. No.: WO2007/051453

PCT Pub. Date: May 10, 2007

(65) Prior Publication Data

US 2008/0296965 A1 Dec. 4, 2008

(30) Foreign Application Priority Data

Nov. 3, 2005 (DE) ........................ 10 2005 052 479

(51) Int. Cl.
*B60B 27/00* (2006.01)
(52) U.S. Cl. ................................ 301/105.1; 301/35.621
(58) Field of Classification Search .................. 301/6.1, 301/6.3, 6.8, 35.621, 35.623, 35.626, 35.632, 301/105.1, 106
See application file for complete search history.

(56) References Cited

U.S. PATENT DOCUMENTS

| 2,272,889 | A | * | 2/1942 | Brink | 301/24 |
| D274,716 | S | * | 7/1984 | Mahnig | D12/207 |
| 4,679,860 | A | * | 7/1987 | Koishi et al. | 301/35.632 |
| 4,699,433 | A | * | 10/1987 | Kopp | 301/6.6 |
| 5,352,026 | A | * | 10/1994 | Snook | 301/105.1 |
| 5,490,720 | A | * | 2/1996 | Archibald | 301/35.621 |
| 6,612,656 | B2 | * | 9/2003 | Koschinat | 301/6.3 |
| 6,666,303 | B2 | * | 12/2003 | Torii et al. | 188/18 A |
| 6,866,345 | B2 | * | 3/2005 | Fakhoury et al. | 301/105.1 |

(Continued)

FOREIGN PATENT DOCUMENTS

EP 0 834 670 A 4/1998

(Continued)

*Primary Examiner*—Russell D Stormer
(74) *Attorney, Agent, or Firm*—Klaus P. Stoffel; Lucas & Mercanti, LLP

(57) ABSTRACT

A wheel hub, which has a central section and a radial section that is radially connected to the central section, a bearing section which axially protrudes from the central section and is used to receive a wheel bearing, and an axially opposing receiving section for receiving a brake disk and a wheel rim. Holes for receiving lug bolts are formed in the radial section. In order to produce an especially light wheel hub that can withstand all operating loads and provides a brake disk with a secure abutment surface under all operating conditions, the wheel hub has recesses at least between some holes, which fully penetrate the wall of the radial section of the wheel hub, and at least one reinforcing element is embodied on the radial end of the wheel hub.

12 Claims, 2 Drawing Sheets

U.S. PATENT DOCUMENTS

| | | | |
|---|---|---|---|
| 6,880,682 B2 * | 4/2005 | Gotti et al. | 188/218 XL |
| 7,111,911 B2 * | 9/2006 | Baumgartner et al. | 301/105.1 |
| 7,393,064 B2 * | 7/2008 | Hall et al. | 301/105.1 |
| 7,607,837 B2 * | 10/2009 | Niebling et al. | 384/544 |

FOREIGN PATENT DOCUMENTS

| | | | |
|---|---|---|---|
| EP | 1 500 524 A | 1/2005 | |
| GB | 2 351 950 Y | 1/2001 | |
| JP | 58-085701 * | 5/1983 | 301/105.1 |
| JP | 07 317755 YA | 12/1995 | |
| JP | 2003 094905 A | 4/2003 | |

* cited by examiner

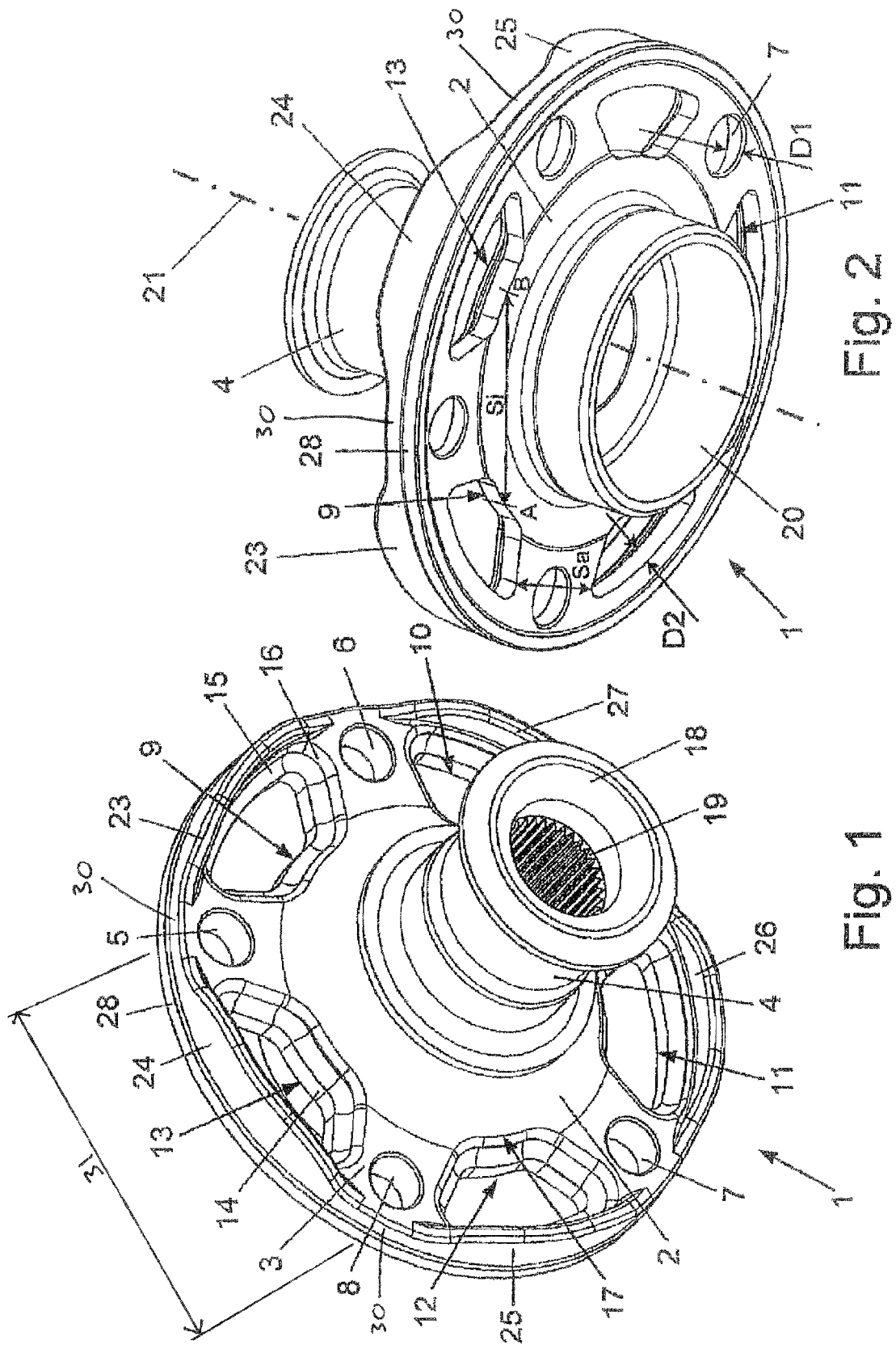

WHEEL HUB COMPRISING AXIAL RECESSES FORMED BETWEEN THE HOLES FOR LUG BOLTS

FIELD OF THE INVENTION

The invention relates to a wheel hub having a central section and a radial section which adjoins the latter radially, having a bearing section which protrudes axially from the central section for receiving a wheel bearing and having a holding section which lies axially opposite for receiving a brake disk and a wheel rim, holes being formed in the radial section for receiving lug bolts.

BACKGROUND OF THE INVENTION

Wheel hubs for motor vehicles are known to a person skilled in the art in many design variants. They are used in the motor vehicle as a connecting element between a drive shaft and a vehicle wheel for connection to the drive shaft, the wheel hub usually has a central receiving section having a plug-in toothing system, into which the free end of the drive shaft can be plugged. Holes having a screw thread are formed on a radial section of the wheel hub in order to fasten the rim of a vehicle wheel, into which holes lug bolts can be screwed with the interposition of a brake disk. In addition, wheel hubs usually have an axial section for receiving and radially centering the wheel rim and the brake disk.

It is also known that wheel hubs of this type are provided with material recesses which are not continuous, in order to reduce the masses which rotate with the vehicle wheel during operation of the vehicle, as a result of which the driving properties of the vehicle can be improved.

OBJECT OF THE INVENTION

Against this background, the invention is based on the object of developing a wheel hub of this type in such a way that its mass can be reduced further in the case of dimensions which are comparable with conventional wheel hubs. Here, the wheel hub is to have high tilting stiffness and arching rigidity, and is to ensure precise guidance of the brake disk and the rim both with regard to the tightening torques of the lug bolts and also in relation to forces which occur during operation.

SUMMARY OF THE INVENTION

In order to achieve this object, a wheel hub having the features of the main claim is provided. Advantageous developments and refinements of the invention can be gathered from the subclaims.

Accordingly, a wheel hub is proposed, having a central section and a radial section which adjoins the latter, having a bearing section which protrudes axially from the central section for receiving a wheel bearing and having a holding section which lies axially opposite for receiving a brake disk and wheel rim, holes being formed in the radial section for receiving lug bolts. In addition, there is provision in this wheel hub for through-openings to be formed at least between some holes in the radial section, which penetrate the wall of the radial section completely, and for at least one reinforcing means to be formed on the radial end of the wheel hub.

Accordingly, the proposed technical solution provides a wheel hub, which axially has apparatus constituent parts for connection to a vehicle drive shaft, for receiving a wheel bearing, a brake disk and a wheel rim. Here, the wheel hub has a radial section which to a great extent represents a lightweight construction on account of the holes for the lug bolts and the continuous through-openings. The reinforcing means, which is formed on the circumference of the wheel hub, ensures sufficiently high rigidity of the wheel hub despite its cutouts in the radial section, the additional material of the wheel hub in the reinforcing region being lower than the sum of the material savings in the region of the cutouts.

According to the respective dimensions and/or mechanical requirements of the wheel hub, the latter can be constructed according to the following features.

According to one advantageous development of the wheel hub according to the invention, the wheel hub is additionally characterized in that the reinforcing means extends axially beyond the edge of the wheel hub in the direction of and coaxially with respect to the bearing section, As a result of this design feature, the contact face for a brake disk which is situated on the other side is kept free axially.

In a first variant, the reinforcing means is formed by a multiplicity of axial projections which are spaced apart from one another under adherence to intermediate spaces in relation to the circumference. The axial projections are preferably arranged in that circumferential sector of the wheel hub, in which the abovementioned through-openings are also formed in the wheel hub, the intermediate spaces between the axial projections being kept free in the region of the holes for receiving the lug bolts.

A second variant provides for the reinforcing means to be configured as a reinforcing ring which extends over the entire circumference of the wheel hub.

There is additionally provision according to the invention for the through-openings to be formed in a uniformly distributed manner over the circumference of the wheel hub between in each case two holes of the radial section.

According to a further preferred feature of the invention, there is provision for, between two adjacent through-openings, the shortest spacing Sa which lies radially to the outside between the adjacent through-openings to be smaller than a spacing Si between two points A, B of the smallest radial distance of the through-openings to the rotational axis of the wheel hub. This principle ensures that the best combination of weight reduction, high component rigidity and most favorable stress distribution in the wheel hub can be realized.

According to this construction principle, the through-openings therefore in a favored manner have a substantially trapezoidal, kidney-shaped or triangular geometry having preferably rounded corners in a cross section with respect to the radial plane of the radial section.

There can additionally be provision for the through-openings, as viewed in the direction of the bearing section, to have a first axial section, a second axial section which adjoins the first axial section and a third axial section which adjoins the second axial section. While the wall faces of the through-openings in the first axial section extend substantially perpendicularly with respect to the radial plane of the radial section, that is to say parallel to the rotational axis of the wheel hub, the wall faces of the two last mentioned sections of the recesses are set with respect to the radial plane at different angles, which become smaller axially, of less than 90°. As a result, the through-openings have openings which widen in a stepped manner.

According to a further feature, there can be provision for the central section to be of conical configuration, the central section tapering axially in the direction of the bearing section. This design detail achieves particularly reliable torque transmission from the central section of the wheel hub to its radial section of filigree construction In addition, the brake disk is offered an axial contact face which is enlarged as a result of the conical profile.

Another development of the construction of the wheel hub provides for the through-openings to extend radially as far as into the conical region of the central section In the case of trapezoidal or kidney-shaped through-openings, there is additionally preferably provision for their short side to point radially to the inside in the direction of the rotational axis of the wheel hub, with the result that more material is removed in that section of the radial section of the wheel hub which is longer in relation to the circumference than in that radially inner section of the latter which is shorter in relation to the circumference.

With regard to the substantially triangular through-openings, there is a provision for them to be formed in the radial section of the wheel hub in such a way that their triangle tip points radially to the inside in the direction of the longitudinal axis of the wheel hub. As a result of the fact that the radial section of the wheel hub has an axial thickness D1 in the region of the holes for the lug bolts, which is greater than the axial thickness D2 in the region of the first axial section of the through-openings, a situation is achieved where the required accuracy in relation to the components can be maintained satisfactorily during forming and punching of a wheel hub blank and the required production steps can be carried out without problems.

BRIEF DESCRIPTION OF THE DRAWINGS

In the following text, the invention will be explained in greater detail by way of two embodiments and using the appended drawing, in which:

FIG. 1 shows a first design variant of a wheel hub which is configured according to the invention, as viewed from the drive side, FIG. 2 shows the wheel hub according to FIG. 1, illustrated from the opposite side.

DETAILED DESCRIPTION OF THE DRAWINGS

Figure 4:
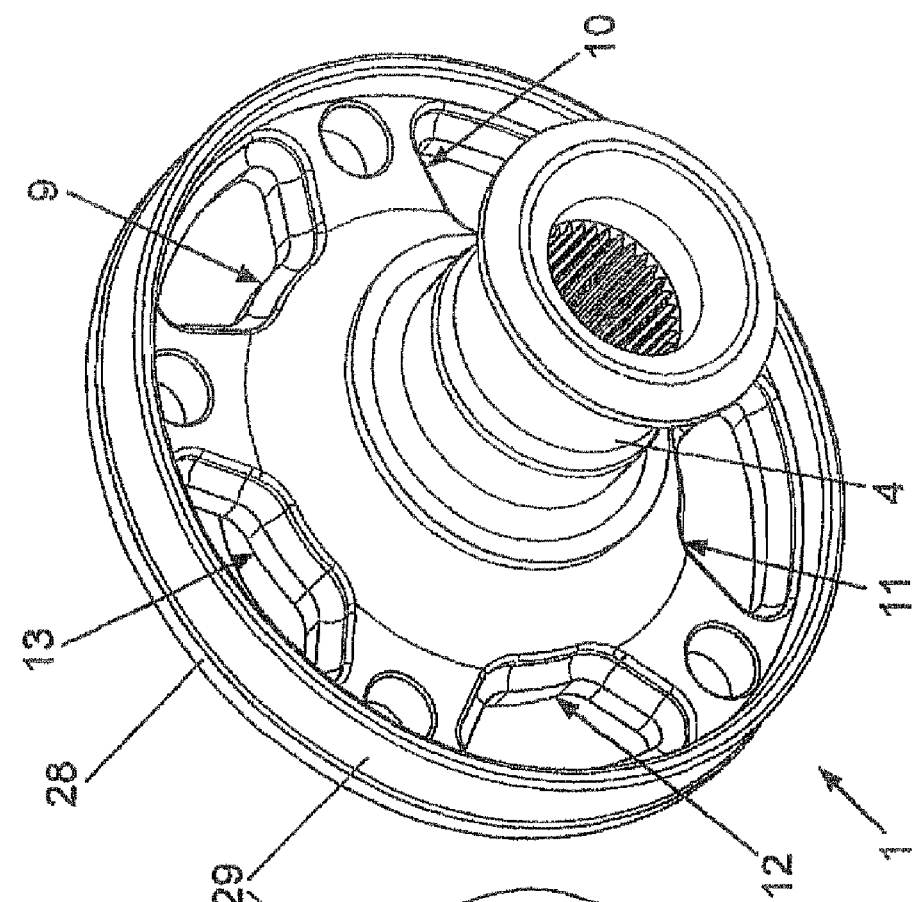
FIG. 4 shows the wheel hub according to FIG. 3, illustrated from the opposite drive side.

As FIGS. 1 and 2 make clear, a wheel hub 1 which is configured according to the invention comprises first of all a central section 2 which is formed substantially perpendicularly with respect to the longitudinal axis 21 of the wheel hub 1. A bearing section 4 for receiving the wheel bearing (not shown) and a stepped receiving section 20 for holding and centering a brake disk (not shown here) and a wheel rim (likewise not shown) extend from this central section 2 coaxially with respect to the longitudinal axis 21. The bearing section 4 is configured in such a way that an inner ring of the wheel bearing can be fastened on its radial outer face, while a plug-in toothing system 19 for receiving an axially toothed journal of a drive shaft is formed in its axial hole. The free axial end of the bearing section 4 is delimited by an annular bead 18.

In this exemplary embodiment, the central section 2 of the wheel hub 1 is configured conically with respect to the longitudinal axis 21, the diameter of this central section 2 decreasing from the radial outside in the direction of the bearing section 4. At its circumference with the greatest diameter, the central section 2 merges into a radial section 3 which serves for fastening the wheel rim and brake disk which are pushed onto the receiving section 20 of the wheel hub 1.

At least the wheel rim can be fastened on the radial section 3 of the wheel hub 1 by means of lug bolts. For this purpose, the lug bolts are screwed into the holes 5, 6, 7 and 8 which are provided with a screw thread (not shown).

Formed in the wheel hub 1 are through-openings 9, 10, 11, 12 and 13 which reach through its radial wall and are arranged in a uniformly distributed manner between the holes 5, 6, 7 and 8. In the exemplary embodiment which is shown in FIGS. 1 and 2, the through-openings 9, 10, 11, 12 and 13 have a substantially trapezoidal cross-sectional geometry in the radial plane.

Here, the longer side of the recesses in relation to the circumference is formed radially on the outside and the shorter side in relation to the circumference is formed radially on the inside on the radial section 3. As FIGS. 1 and 2 show clearly, the through-openings 9, 10, 11, 12 and 13 can extend radially as far as into the conical central section 2.

As viewed in the direction of the bearing section 4, the through-openings 9, 10, 11, 12 and 13 have in each case three axial sections 14, 15 and 16, of which the first axial section 14 has wall faces which are oriented substantially parallel to the longitudinal axis 21 or perpendicularly with respect to the radial plane of the radial section 3, while the wall faces of the two adjacent axial sections 15 and 16 are set with respect to the radial plane at different angles which decrease axially with respect to one another of less than 90°.

In addition, according to another advantageous refinement, there can be provision for the through-openings 9, 10, 11, 12 and 13 to have an arcuate profile 17 on their side which lies radially on the inside and/or to have rounded corners overall. As a result, the through-openings 9, 10, 11, 12 and 13 have an approximately kidney-shaped geometry. A low-stress force profile within the wheel hub 1 is realized as a result of the depicted configuration of the edges and the sides of the through-openings 9, 10, 11, 12 and 13.

FIG. 2 shows that because the axial sections 14, 15, 16 of the through-openings 9, 10, 11, 12 and 13 are stepped, the wheel hub 1 has different wall thicknesses in their region and in the region of the holes 5, 6, 7, 8. The wall thickness D1 in the region of the holes 5, 6, 7, 8 is therefore greater than the wall thickness D2 in the region of the first axial section 14 of the through-openings 9, 10, 11, 12 and 13. The wall thickness D1 in the region of the holes 5, 6, 7, 8 is preferably more than twice as great as the wall thickness D2.

As a result of the wall-thickness configuration, the workpiece integrity and a high manufacturing accuracy are ensured during the production of the through-openings 9, 10, 11, 12, 13 and the holes 5, 6, 7, 8 using manufacturing technology. Here, the through-openings 9, 10, 11, 12 and 13 are preferably produced by a forming process and the holes 5, 6, 7, 8 are preferably produced by drilling.

According to a further aspect of the invention, there is provision for the through-openings 9, 10, 11, 12, 13 to be configured in an optimized manner with regard to their dimensions and their spacing in such a way that as lightweight as possible a wheel hub I can be produced which can absorb all the operating loads which act on it without damage and forms a non-corrugated bearing face in relation to the circumference for a brake disk.

For this purpose, the through-openings 9, 10, 11, 12, 13 are configured and spaced apart from one another in such a way that the shortest spacing Sa which lies radially on the outside between two adjacent recesses is smaller than that spacing Si between two points A and B which mark the smallest radial spacing of the through-openings 9, 10, 11, 12, 13 with respect to the rotational axis 21 of the wheel hub 1.

The through-openings 9, 10, 11, 12, 13 can also be of largely oval configuration in their radially outer region and of comparatively pointed configuration in the region which points radially toward the rotational axis 21, which is not shown here in further detail. Here, the tip of the respective through-openings 9, 10, 11, 12, 13 extends radially in the direction of the rotational axis 21 of the wheel hub 1. Here, the abovementioned points A and B of two adjacent through-openings 9, 10, 11, 12, 13 are defined by the respective tip.

In order to reinforce the wheel hub 1, according to the exemplary embodiment which is shown in FIGS. 1 and 2, the wheel hub 1 has axial projections 23, 24, 25, 26 and 27 which extend coaxially from the radial end 28 of the wheel hub 1 in the direction of the bearing section 4. Here, an intermediate space 30 which is formed in the region of the holes 5, 6, 7 and 8 for receiving the lug bolts is left free between each lug in relation to the circumference As FIGS. 1 and 2 make clear, the axial projections 23, 24, 25, 26 and 27 are arranged in a circumferential sector 31 and have a largely arcuate profile, the greatest axial extent being situated approximately in the center of the associated cutout 9, 10, 11, 12, 13.

Figure 3:
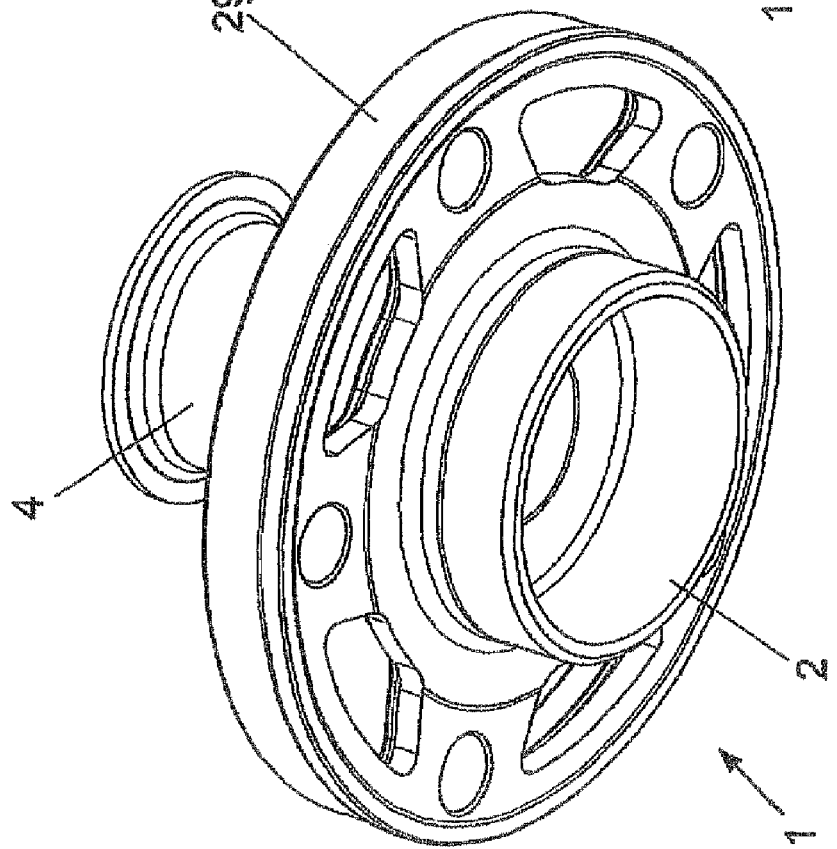
FIG. 3 shows a second design variant of a wheel hub according to the invention, as viewed from the rim and brake disk side.

It can be gathered from FIGS. 3 and 4 that the reinforcing means can also be formed by a reinforcing ring 29 which is positioned on the radial end 28 of the wheel hub 1 and extends coaxially in the direction of the bearing section 4, and in the process covers all the holes 5, 6, 7, 8 and cutouts 9, 10, 11, 12, 13.

LIST OF DESIGNATIONS

1 Wheel hub
2 Central section
3 Radial section
4 Bearing section
5 Hole
6 Hole
7 Hole
8 Hole
9 Through-opening
Recess
11 Through-opening
12 Through-opening
13 Through-opening
14 First axial section
15 Second axial section
16 Third axial section
17 Arcuate profile of the recess
18 Annular bead
19 Plug-in toothing
20 Holding section for brake disk and wheel rim
21 Rotational axis
23 Axial projection
24 Axial projection
25 Axial projection
26 Axial projection
27 Axial projection
28 Radial end of the wheel hub
29 Reinforcing ring
A Point on a recess
B Point on a recess
D1 Wall thickness
D2 Wall thickness
Sa Outside spacing
Si Inside spacing

The invention claimed is:

1. A wheel hub, comprising:

a central section;

a radial section adjoining the central section radially;

a bearing section protruding axially from the central section for receiving a wheel bearing; and a holding section lying axially opposite the bearing section for receiving a brake disk and a wheel rim, holes being formed in the radial section for receiving lug bolts, wherein the wheel hub has through-openings, which are enclosed on all sides, at least between some of the holes formed in the radial section that penetrate a wall of the radial section of the wheel hub completely, and at least one reinforcing means is formed on a radial outermost edge of the radial section, the reinforcing means being configured as a plurality of axial projections spaced apart from one another by intermediate spaces, and extending axially in a direction of the bearing section.

2. The wheel hub of claim 1, wherein the axial projections are arranged in a circumferential sector of the radial section, in which the through-openings are also formed, and the intermediate spaces between the reinforcing means are in a region of the holes.

3. The wheel hub of claim 1, wherein the through-openings are uniformly distributed such that each through-opening is formed between each pair of adjacent holes.

4. The wheel hub of claim 1, wherein, between two adjacent through-openings, a shortest spacing, which lies radially outwardly, between the adjacent through-openings is smaller than a spacing between two points of a smallest radial distance of the through-openings to the adjacent through-openings at a rotational axis of the wheel hub.

5. The wheel hub of claim 4, wherein the through-openings have a substantially trapezoidal, kidney-shaped or triangular cross-section in a radial plane of the radial section.

6. The wheel hub of claim 5, wherein the trapezoidal or kidney-shaped through-openings are formed in the radial section in such a way that a side of the trapezoidal or kidney-shaped through-openings pointing radially inward, toward the rotational axis of the wheel hub is shorter than a side of the trapezoidal or kidney-shaped through-openings closest to the radial end of the radial section.

7. The wheel hub of claim 5, wherein the through-openings are triangular through-openings formed in the radial section in such a way that a tip of each of the triangular through-openings points radially inward, toward the rotational axis of the wheel hub.

8. The wheel hub of claim 1, wherein the through-openings, as viewed in a direction of the hearing section, have a first axial section, a second axial section which adjoins the first axial section and a third axial section which adjoins the second axial section, wall faces of the through-openings in the first axial section extending substantially perpendicularly with respect to a radial plane of the radial section, while wall faces of the second axial section and the third axial section are set with respect to the radial plane at different angles, which becomes smaller axially, of less than 90°.

9. The wheel hub of claim 1, wherein the central section is of conical configuration, tapering axially in a direction of the bearing section.

10. The wheel hub of claim 9, wherein each of the through-openings extend an equal distance radially into the conical configuration of the central section.

11. The wheel hub of claim 8, wherein the radial section has an axial thickness in a region of the holes, which is greater than the axial thickness in a region of the first axial section of the through-openings.

12. The wheel hub of claim 1, wherein the through-openings have rounded corners.

* * * * *